United States Patent [19]
Sohl et al.

[11] Patent Number: 5,669,279
[45] Date of Patent: Sep. 23, 1997

[54] SHEARING MACHINE FOR TRIMMING FLAT MATERIAL PARTICULARLY SHEETS AND STRIPS OF METAL

[75] Inventors: Ralf-Hartmut Sohl, Solingen; Robert Berg, Langenfeld, both of Germany

[73] Assignee: SMS Schloemann-Siemag Aktiengesellschaft, Düsseldorf, Germany

[21] Appl. No.: 577,275

[22] Filed: Dec. 22, 1995

[30] Foreign Application Priority Data

Dec. 23, 1994 [DE] Germany ............... 44 46 267.0

[51] Int. Cl.$^6$ ............... B23D 19/04; B26D 1/24
[52] U.S. Cl. ............... 83/425.2; 83/498; 83/504; 83/507; 83/508.2
[58] Field of Search ............... 83/503, 504, 507, 83/498, 499, 508.3, 425.2, 508.1, 508.2

[56] References Cited

U.S. PATENT DOCUMENTS

| | | | |
|---|---|---|---|
| 1,278,766 | 9/1918 | Seymour | 83/503 |
| 2,307,452 | 1/1943 | Cohen | 83/503 |
| 2,664,950 | 1/1954 | Morgan et al. | 83/507 |
| 3,257,887 | 6/1966 | Jones | 83/504 |
| 3,364,803 | 1/1968 | Senftleben | 83/503 |
| 4,459,888 | 7/1984 | Frye | 83/507 |
| 4,515,052 | 5/1985 | Flaum | 83/499 |
| 4,676,133 | 6/1987 | Fujimura | 83/503 |
| 4,934,234 | 6/1990 | Cavagna | 83/498 |
| 5,247,865 | 9/1993 | Kroger et al. | 83/503 |

FOREIGN PATENT DOCUMENTS 2072563 10/1981 United Kingdom ............... 83/498

*Primary Examiner*—Kenneth E. Peterson
*Assistant Examiner*—Sean A. Pryor
*Attorney, Agent, or Firm*—Friedrich Kueffner

[57] ABSTRACT

A shearing machine for trimming flat material, particularly sheets and strips of metal, includes a rotary blade shear with rotary blade shafts which support the rotary blades and are mounted in an upper blade housing and a lower blade housing. For adjusting the blade gap and the blade overlap in dependence on the material thickness and the material strength, a transverse eccentric is mounted between the upper and lower shear housings so as to connect these housings. The shearing machine further includes a center cut shear with rotary blade shafts which support the rotary blades and are mounted in an upper blade housing and lower blade housing, a frame supporting the center cut shear, and a blade gap adjusting device with a reversible transverse eccentric, wherein the blade gap adjusting device is mounted between the frame and the upper rotary blade of the center cut shear and acts with its transverse eccentric on the end of the movably constructed upper blade housing at the side of the blade.

7 Claims, 3 Drawing Sheets

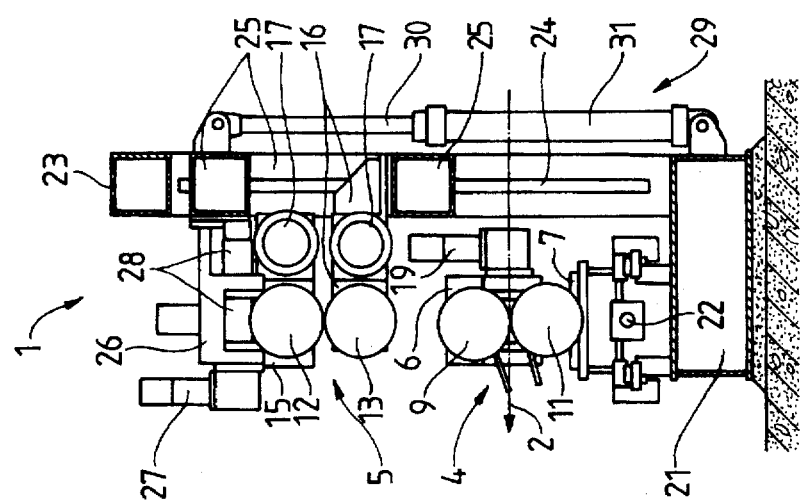
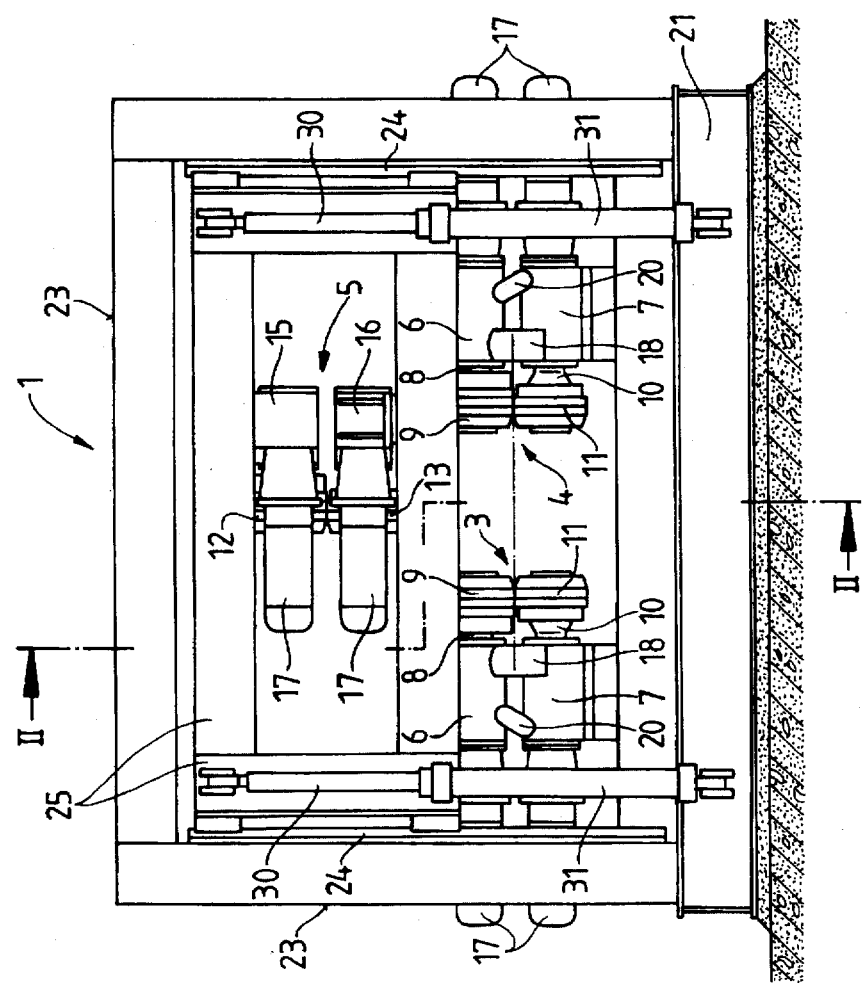

SHEARING MACHINE FOR TRIMMING FLAT MATERIAL PARTICULARLY SHEETS AND STRIPS OF METAL

BACKGROUND OF THE INVENTION

1. Field of the Invention

The present invention relates to a shearing machine for trimming flat material, particularly sheets and strips of metal. The shearing machine includes a rotary blade shear with rotary blade shafts which support the rotary blades and are mounted in an upper blade housing and a lower blade housing. For adjusting the blade gap and the blade overlap in dependence on the material thickness and the material strength, a transverse eccentric is mounted between the upper and lower shear housings so as to connect these housings. The shearing machine further includes a center cut shear with rotary blade shafts which support the rotary blades and are mounted in an upper blade housing and lower blade housing.

2. Description of the Related Art

Rotary blade shears of this type are predominantly used in plants for strip treatment, for example, in pickling lines, hot galvanizing lines, shearing lines, etc., in order to sever the two strip edges, wherein the strip is to be cut as much as possible to exact strip width with the requirement of low tolerances. In order to achieve clean cut edges, it is necessary to adjust the blade gap and the blade overlap in dependence on the material thickness and the material strength of the material being cut. The blade gap is understood to be the essentially horizontal distance between the cutting edge planes of the two rotary blades which are located one above the other, wherein this distance is selected larger with increasing material thickness. The blade overlap is the dimension of the vertical distance of the cutting edges of the two corresponding rotary blades during the cut; the blade overlap is positive when, in the horizontal projection, the rotary blades actually overlap in the cutting area.

For adjusting the cutting edge positions with respect to blade gap and blade overlap, EP 0 289 799 A discloses a device, called blade gap adjusting device hereinbelow, which makes possible a simple adjustment and which has proved in actual use to be capable of excellent adjustment. The upper blade carrier of the rotary blade shear of this device is constructed as the coupler of a four-bar linkage, so that it is possible, by appropriate dimensioning of the linkage components and of the turning range of the crank, to describe with a certain point of the coupler a desired curve in space or coupler curve. The frame of the four-bar linkage is defined by the lower blade housing and the crank is composed of an eccentric; the eccentric is called transverse eccentric hereinbelow. The transverse eccentric acts on the end of the upper blade housing on the side of the blade and the stroke of the transverse eccentric and the dead center position thereof are selected in such a way that, when a reversible rotary adjustment of the transverse eccentric which is adjustable by a gear motor with brake is carried out, each point of the upper rotary blade follows a desired curve in space. The transverse eccentric engages with a projection in the end of the upper blade housing at the side of the blade and, thus, its rotary adjustment determines the direction and the magnitude of the blade adjustment.

When producing wide strips, sheets or the like, in addition to the trimming cuts carried out by the two oppositely located rotary blade shears, a center cut is also required in order to divide the wide strip into two narrow strips of equal width. In known center cut shears combined with rotary blade trimming shears, it has been found to be a problem to maintain the permissible small strip width tolerances; in addition, it has been found that, because of the type of construction of the known center cut shears, the rotary blade gap adjusting device known from the above-described rotary blade trimming shear using a transverse eccentric arranged reversibly between the upper and lower blade housings, is not suitable.

SUMMARY OF THE INVENTION

Therefore, it is the primary object of the present invention to provide a shearing machine of the above-described type with an improved operation of the center cut shear, and in particular to make it possible to provide the center cut shear also with a blade gap adjusting device and to achieve small strip width tolerances of the cut flat material.

In accordance with the present invention, the shearing machine of the above-described type includes a frame supporting the center cut shear and a blade gap adjusting device with a reversible transverse eccentric, wherein the blade gap adjusting device is mounted between the frame and the upper rotary blade of the center cut shear and acts with its transverse eccentric on the end of the movably constructed upper blade housing at the side of the blade.

The arrangement of the center cut shear in a separate frame makes it possible, on the one hand, to realize the above-described blade gap adjusting device which has proved successful in rotary blade trimming shears also in the center cut shear and, thus, to carry out cutting edge adjustments in a simple and optimum manner. This is because the upper blade housing arranged in frame support structure can be mounted movably in the frame independently of the lower blade housing which advantageously is connected fixedly to the frame.

In accordance with a preferred feature, the upper blade housing of the center cut shear is movably suspended from a support arm of the frame which cantilevers from the frame in longitudinal direction of the strip. As is the case in the known rotary blade trimming shears, the transverse eccentric mounted in the support arm can engage with a projection in the upper blade housing which is movably suspended from the support arm, so that also in the center cut shear the direction and the magnitude of the blade adjustment can be determined by the rotary adjustment of the transverse eccentric. In addition, it is possible to obtain for the center cut shear an operating position in which the rotary blades of the center cut shear are located on the same axis as the rotary blades of the trimming shears, so that it is possible to maintain small strip width tolerances.

In accordance with a preferred further development of the invention, the frame of the center cut shear is vertically adjustably mounted in an outer frame and is preferably mounted in vertical guide means of the outer frame. The mounting of the frame of the center cut shear in an outer frame makes it possible to adjust all rotary blades in such a way that they are located on one axis in the position of operation. The vertical adjustability of the center cut shear additionally provides the capability for a variable use of the shearing machine because it can be operated exclusively as a trimming shear in the case of a program change, i.e., when narrower strips are to be cut. In that case, the center cut shear only has to be raised into a position in which it is out of operation, so that the distance between the two oppositely located rotary blade trimming shears can be reduced in accordance with the narrower width of the entering strip.

For raising and lowering the center cut shear, the frame of the center cut shear may include a lifting unit. If, in accordance with a preferred feature, the outer frame is arranged on a base plate, a further development of the invention provides that the lifting unit is composed of adjusting cylinders which are fastened, on the one hand, to the base plate and which act, on the other hand, with their piston rods on the frame of the center cut shear. Pneumatic cylinders or hydraulic cylinders are suitable as cylinders of the lifting unit.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a front elevational view of a shearing machine composed of a rotary blade trimming shear with two oppositely located cutting units in combination with a center cut shear;

FIG. 2 is sectional view taken along sectional line II—II of FIG. 1;

DETAILED DESCRIPTION OF THE INVENTION

Figure 3:
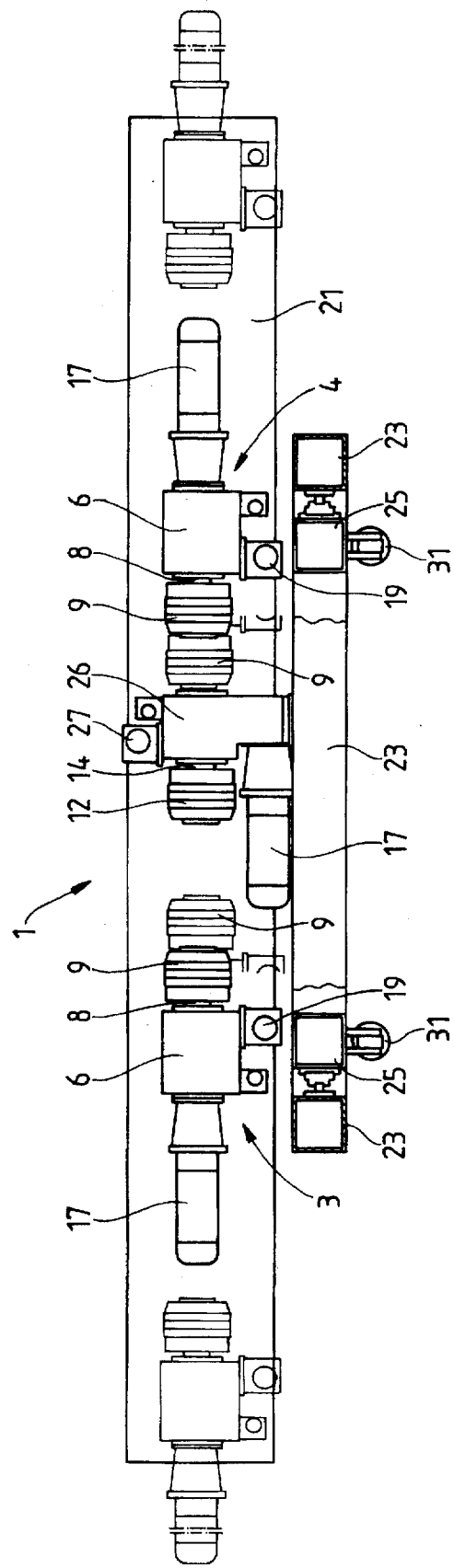
FIG. 3 is a top view of the shearing machine of FIG. 1.

FIG. 1 of the drawing shows a shearing machine 1 which is capable of trimming flat material, particularly sheets and strips of metal, and of dividing the flat material in the middle thereof into two narrow strips of equal width. As shown in FIG. 1, the shearing machine 1 has a rotary blade shear 3 and 4, respectively, at each strip edge of the strip travelling through the shearing machine 1 in the plane of the drawing in the direction 2 shown in FIG. 2, and a center cut shear 5. Each of the rotary blade shears 3 and 4 is composed of an upper blade housing 6, a lower blade housing 7, an upper rotary blade shaft 8 with rotary blades 9 mounted in the upper blade housing 6 and a lower rotary blade shaft with lower rotary blades 11 mounted in the lower blade housing 7.

Figure 4:
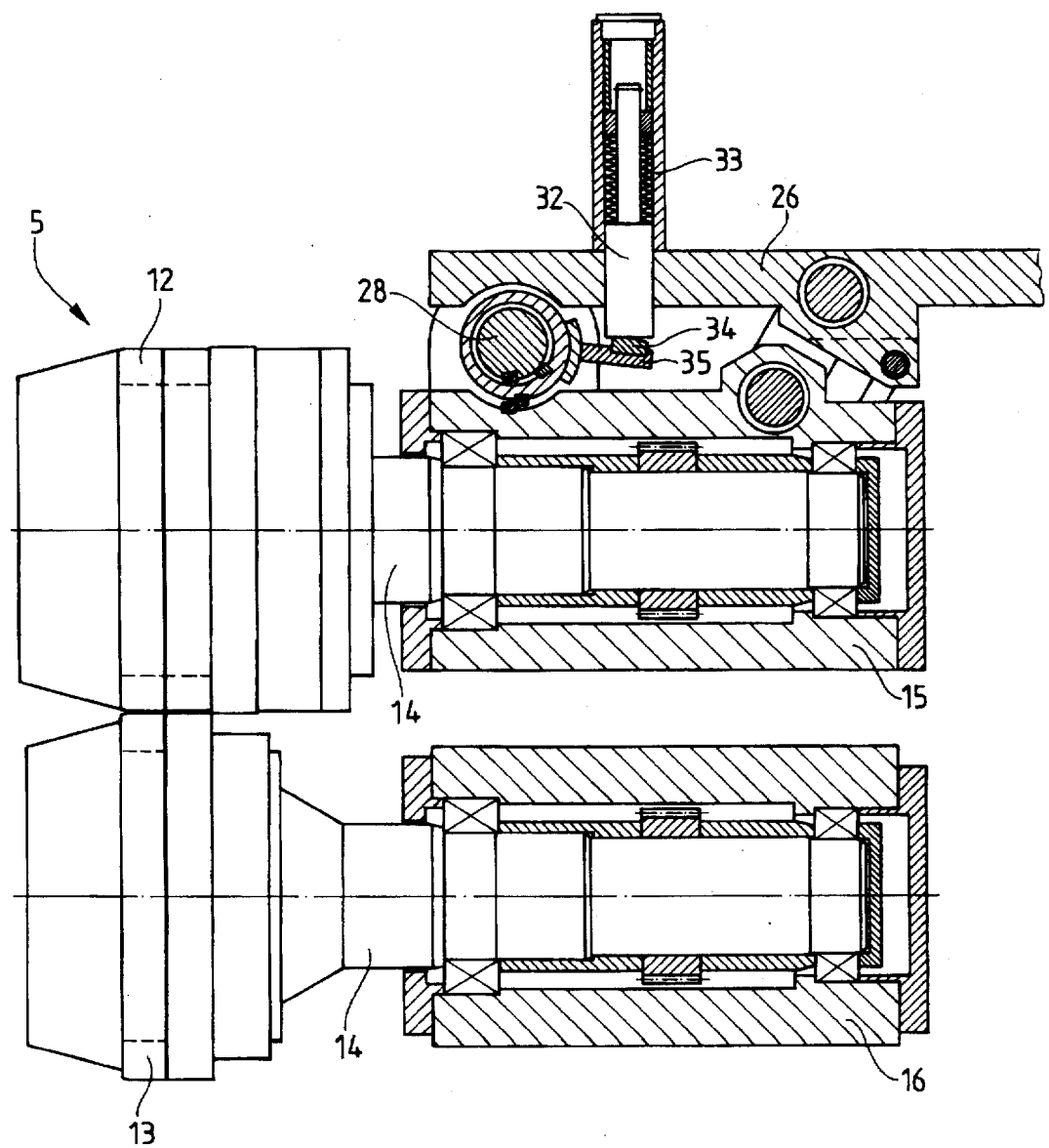
FIG. 4 is a longitudinal sectional view, on a larger scale, of the upper and lower blade housings of the center cut shear.

The construction of the center cut shear 5 is similar to that of the rotary blade shears 3 and 4, i.e., the shear 5 is composed of an upper rotary blade 12 and a lower rotary blade 13 which are mounted through rotary blade shafts 14 in an upper blade housing 15 and a lower blade housing 16, respectively, as shown in FIG. 4. The rotary blades 12, 13 of the center cut shear 5, as well as the rotary blades 9, 11 of the rotary blade shears 3 and 4, are driven by gear motors 17; the rotary blade shears 3 and 4 are not driven when the rotary blades 9, 11 are rotated by the feeding movement of the strip to be trimmed.

The rotary blade shears 3, 4 are equipped with a blade gap adjusting device described in the above-mentioned EP 0 289 799 A; thus, the rotary blade shears 3 and 4 each have a transverse eccentric 18 which connects in an articulated manner the upper blade housing 6 to the stationary lower blade housing 7. For a defined rotary adjustment of the transverse eccentric 18, a gear motor 19 with brake as shown in FIG. 3 is provided. In addition to the transverse eccentric 18, a superposed eccentric 20 each is provided. The rotary blade shears 3 and 4 are mounted on a base plate 21 so as to be displaceable together as a unit; a threaded spindle 22, schematically illustrated in FIG. 2, is used for displacing the shears 3 and 4. The threaded spindle 22 is driven by a motor, not shown, and displaces the two rotary blade shears 3 and 4 in order to adjust the desired width of the strip.

Mounted on the base plate 21 is a frame structure composed of an outer frame 23 and an inner frame 25 vertically adjustably guided in the outer frame 23 in vertical guide means 24. The inner frame 25 has a cantilevering support arm 26 extending in the strip travel direction 2. As shown in FIG. 4, the upper blade housing 15 of the center cut shear 5 is movably suspended or pivotally mounted in the support arm 26. Also mounted in the support arm 26 is a transverse eccentric 28 adjustable by means of a gear motor 27 and corresponding to the reversible traverse eccentric 18 of the blade gap adjusting devices of the two rotary blade shears 3 and 4. On the other hand, the lower blade housing 16 of the center cut shear 5 is fixedly connected to the inner frame 25. For compensating the play in the areas of the bearings for the transverse eccentric 28, the transverse eccentric 28 is provided at the upper blade housing 15 with a push rod 32 with a spring bundle 33 which exerts a pressure on the curved outer surface of a pressure piece 34 of a pressure application arm 35 connected to the transverse eccentric 28.

The double-frame construction makes it possible to arrange the upper blade housing 15 of the center cut shear 5 so as to be movable and to provide a blade gap adjusting device with a transverse eccentric 28 between the support arm 26 of the inner frame 25 vertically guided in the outer frame 23 and the upper blade housing 15. In addition, the inner frame 25 and, thus, the center cut shear 5 supported by the inner frame 25, are adjustable with respect to their vertical positions by means of a lifting unit 29 which is composed of hydraulic or pneumatic adjusting cylinders 31 which are connected, on the one hand, to the base plate 21 and, on the other hand, with their piston rods 30 to the frame 25 of the center cut shear 5.

When the center cut shear 5 is raised into the position in which it is out of operation, as shown in FIG. 1, the two oppositely located rotary blade shears 3 and 4 can be moved close toward each other for trimming narrow strips; in that position, the raised center cut shear 5 is not in the way of the rotary blade shears 3 and 4. In the lowered position of operation, the center cut shear 5 is placed in the free space between the oppositely located rotary blade shears 3 and 4, as shown in FIG. 3. Thus, without limiting the minimum width of the strip, it is possible to locate the rotary blades 12 and 13 of the center cut shear 5 and the rotary blades 9, 11 of the rotary blade shears 3 and 4 in the same axial positions, so that small band width tolerances can be maintained. The minimum width of the strip to be trimmed at which a center cut can simultaneously be carried out is illustrated in FIG. 3 by the inwardly moved positions of the blade shafts 9 of the rotary blade shears 3 and 4 illustrated in thin lines.

While specific embodiments of the invention have been shown and described in detail to illustrate the inventive principles, it will be understood that the invention may be embodied otherwise without departing from such principles.

We claim:

1. A shearing machine for trimming flat material, particularly sheets and strips of metal, the shearing machine comprising a pair of spaced apart rotary blade shears, each rotary blade shear having an upper blade housing and a lower blade housing, and rotary blade shafts with rotary blades mounted in the upper blade housing and the lower blade housing, further comprising a transverse eccentric connecting the upper blade housing and the lower blade housing for adjusting a blade gap and a blade overlap in dependence of a material thickness and a material strength, further comprising a center cut shear having a movable upper blade housing and lower blade housing and rotary blade shafts with rotary blades mounted in the upper blade housing and the lower blade housing of the center cut shear, a frame supporting the center cut shear and a blade gap adjusting device with a reversible transverse eccentric mounted between the frame and the rotary blade of the rotary blade shaft of the upper blade housing of the center cut shear, wherein the reversible transverse eccentric is connected to an end of the upper blade housing of the center cut shear adjacent the rotary blades thereof, wherein the frame of the center cut shear is vertically adjustably mounted in an outer frame.

2. The shearing machine according to claim 1, wherein the frame comprises a support arm cantilevering from the frame in a longitudinal direction of the flat material, the upper blade housing of the center cut shear being movably suspended in the support arm of the frame.

3. The shearing machine according to claim 1, wherein the lower blade housing of the center cut shear is fixedly connected to the frame.

4. The shearing machine according to claim 1, wherein the outer frame comprises vertical guide means for the frame of the center cut shear.

5. The shearing machine according to claim 1, further comprising a lifting unit for the frame of the center cut shear.

6. The shearing machine according to claim 1, wherein the outer frame is mounted on a base plate.

7. The shearing machine according to claim 6, wherein the lifting unit comprises adjusting cylinders with piston rods, and wherein the adjusting cylinders are connected to the base plate and the piston rods of the adjusting cylinders are connected to the frame of the center cut shear.

* * * * *